Dec. 19, 1950 U. G. HOFFMAN 2,534,265
FREE AIR TEMPERATURE INDICATOR
Filed Oct. 7, 1947
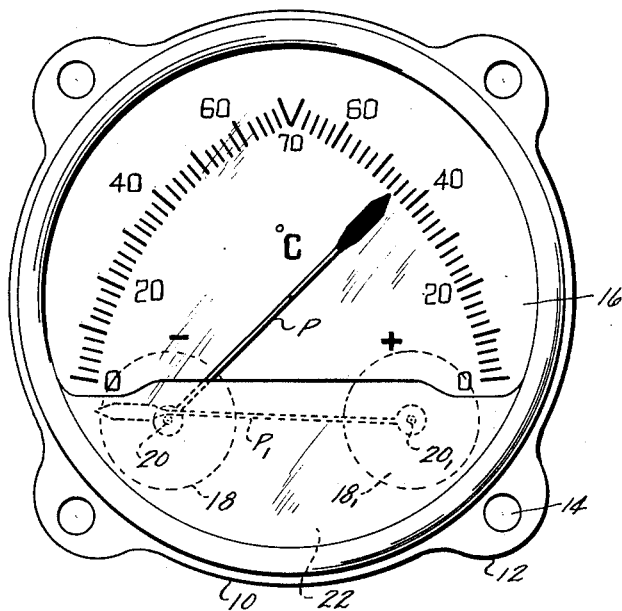
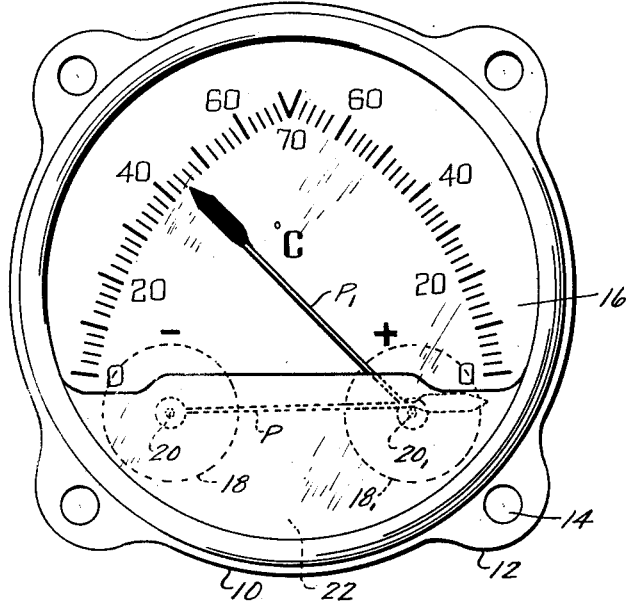
INVENTOR.
ULYSSES G. HOFFMAN
BY Wade Koontz and
Frederick W. Cotterman
ATTORNEYS Patented Dec. 19, 1950

2,534,265

UNITED STATES PATENT OFFICE 2,534,265

FREE AIR TEMPERATURE INDICATOR

Ulysses G. Hoffman, Dayton, Ohio

Application October 7, 1947, Serial No. 778,449

1 Claim. (Cl. 73—339)

(Granted under the act of March 3, 1883, as amended April 30, 1928; 370 O. G. 757)

The invention described herein may be manufactured and used by or for the Government for governmental purposes without payment to me of any royalty thereon.

This invention relates to free air temperature indicators of the kind which are operated by ratio meters such as are found in the D'Arsonval temperature indicator and particularly to a novel arrangement of the several elements of an indicator of this character.

While the D'Arsonval type movement is the most accurate of the commercially available instruments used in flight test work, there is a present demand for increased range as well as for increased accuracy in flight test temperature indicating instruments.

Commercially available instruments operated by the above type movement may have an angular pointer travel not to exceed one hundred degrees, and where extreme accuracy is desired the pointer travel may preferably be considerably less. If the maximum travel of one hundred degrees is used and if the scale is so graduated that each degree of angular travel of the pointer is made to represent a degree of centigrade, the instrument will have a temperature range of one hundred degrees which may be divided part above and part below zero centigrade as desired.

But the present demand is for an instrument having a range of one hundred forty degrees centigrade, whereby, if the one hundred degree maximum needle travel is divided into one hundred forty divisions, each representing a degree centigrade, the divisions become too small to photograph distinctly, when, as is usual, a photographic record of the temperature reading is being made.

It is therefore an object of this invention to provide an instrument of this character with two separate D'Arsonval type operating movements, two pointers, and two graduated scales, whereby each pointer and its corresponding scale may cover half the desired range of one hundred forty degrees centigrade, and while each pointer could then be made to move through an angular distance of one hundred degrees, for the sake of accuracy, an angular travel of considerably less than the maximum travel of one hundred degrees is employed.

Where there are two pointers and two scales in the same instrument and both are visible at the same time, there may be confusion in the reading of the instrument or of the record made from it.

It is therefore another object of the invention to so construct and arrange the instrument herein disclosed that when both pointers are at the zero end of their scales, neither is visible to the observer and when either pointer rises above the zero of its scale, that pointer only is visible to the observer.

Other objects and advantages will appear as the invention is further described with reference to the drawing, wherein:

Fig. 1 shows an instrument embodying my invention in which the hot or plus side is in operation.

Fig. 2 shows the same instrument as seen in Fig. 1 except that the cold or minus side is in operation.

Like reference characters refer to like parts throughout the several views.

Referring now to the drawing, a casing 10 is provided with ears 12 having openings 14 whereby the instrument is secured to the instrument panel of an aircraft. A dial 16 carries a plus scale + and minus scale — respectively.

The two operating movements 18 and $18_1$ carry pointers P and $P_1$ which are pivoted at 20 and $20_1$ respectively. The arc of the plus scale + is drawn at a radius centered at 20 while the arc of the minus scale — is drawn at a radius centered at $20_1$. Pointer P and $P_1$ have their free ends pointing at, and are movable along, the plus scale + and minus scale — respectively.

Both scales are graduated to read from zero degrees centigrade to seventy degrees centigrade, the operating units being such that the plus + indicates temperature 0 to 70 degrees above zero centigrade and the minus — indicates temperatures 0 to 70 degrees below zero centigrade, the scales being spread over an angular distance of approximately sixty-one degrees each. Thus the overall angular movement of the pointers is considerably lower than maximum which makes for greater accuracy, and the distance between graduations is greater than would be the case where a single pointer and a single scale were used.

A shield 22 partly covers the dial 16 and completely covers both pointers P and $P_1$ when they are both in their home positions, the pointer P being shown in the home position in Fig. 2 and the pointer $P_1$ being shown in the home position in Fig. 1.

From the foregoing description it will be evident that, in the instrument disclosed, great accuracy is attained because of the relatively short arc through which each pointer swings, and that wider spacing between the graduations of the scale is had because the arcuate length of one of the scales is divided into a lesser number of temperature degree spaces.

The considerable advantage of having visible that pointer only which is then in operation is also noted. This avoids confusion in reading the instrument.

Having described my invention, I claim:

In a temperature measuring instrument of the character described, a casing, a pair of spaced apart operating movements of the ratio meter type in said casing, pivoting means for said movements symmetrically positioned in a horizontal plane which is located intermediate the center and the bottom of said casing, a dial on said casing covering the operating movements, said dial having openings through which said pivoting means extend, a pointer carried by each said pivoting means and overlying said dial, said pointers, in their home position lying substantially in said horizontal plane, the right pointer pointing left and the left pointer pointing right, a shield overlying said pointers but only when they are in the home position, an arcuate temperature scale, the arc of said scale being drawn from the pivotal point of the left movement and extending from a zero position at the right-hand side of the dial upward and to the left, a second arcuate temperature scale drawn from the pivotal point of the right movement and extending from a zero position at the left-hand side of the dial upward and to the right, the pivoting means of the left operating movement being rotatable anticlockwise from its home position by a rise in temperature above the zero position, thereby swinging the left pointer from in back of the shield and along the right scale when the temperature is above zero, and the pivoting means of the right operating movement being rotatable clockwise from its home position by a drop in temperature below the zero position thereby swinging the right pointer from in back of the shield and along the left scale when the temperature is below zero.

ULYSSES G. HOFFMAN.

REFERENCES CITED

The following references are of record in the file of this patent:

UNITED STATES PATENTS

| Number | Name | Date |
|---|---|---|
| 1,605,779 | Rissmann | Nov. 2, 1926 |
| 2,235,390 | Smith | Mar. 18, 1941 |
| 2,448,461 | Postal | Aug. 31, 1948 |

FOREIGN PATENTS

| Number | Country | Date |
|---|---|---|
| 212,443 | Germany | Aug. 3, 1909 |